United States Patent
Lubkoll et al.

(10) Patent No.: US 10,538,597 B2
(45) Date of Patent: *Jan. 21, 2020

(54) ACYLATION PROCESS

(71) Applicant: Rhodia Acetow GmbH, Freiburg (DE)

(72) Inventors: Jana Lubkoll, Freiburg (DE); Armin Stein, Kenzingen (DE)

(73) Assignee: Rhodia Acetow GmbH, Freiburg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/029,006

(22) PCT Filed: Oct. 15, 2014

(86) PCT No.: PCT/EP2014/072150
§ 371 (c)(1),
(2) Date: Apr. 13, 2016

(87) PCT Pub. No.: WO2015/055734
PCT Pub. Date: Apr. 23, 2015

(65) Prior Publication Data
US 2016/0257766 A1  Sep. 8, 2016

(30) Foreign Application Priority Data
Oct. 16, 2013  (EP) .................... 13188986

(51) Int. Cl.
| C08B 33/02 | (2006.01) |
| C08B 35/02 | (2006.01) |
| C09D 103/16 | (2006.01) |
| C09J 103/16 | (2006.01) |
| C09J 103/06 | (2006.01) |
| C09D 103/06 | (2006.01) |
| C08B 3/00 | (2006.01) |
| C08B 1/02 | (2006.01) |

(52) U.S. Cl.
CPC .............. *C08B 33/02* (2013.01); *C08B 1/02* (2013.01); *C08B 3/00* (2013.01); *C08B 35/02* (2013.01); *C09D 103/06* (2013.01); *C09D 103/16* (2013.01); *C09J 103/06* (2013.01); *C09J 103/16* (2013.01); *Y02P 20/582* (2015.11)

(58) Field of Classification Search
None
See application file for complete search history.

(56) References Cited

U.S. PATENT DOCUMENTS

| 3,388,120 A | 6/1968 | Lotzgesell et al. |
| 3,719,664 A | 3/1973 | Hayes et al. |
| 4,075,143 A | 2/1978 | Schelhaas et al. |
| 4,095,992 A | 6/1978 | Rudolph et al. |
| 5,362,510 A | 11/1994 | Mizoguchi et al. |
| 5,629,416 A * | 5/1997 | Neigel .................. C08B 31/006 536/102 |
| 5,703,226 A | 12/1997 | Nickel et al. |
| 5,710,269 A | 1/1998 | Feuer |
| 5,962,047 A | 10/1999 | Gross et al. |
| 6,413,505 B1 | 7/2002 | Vitale et al. |
| 2005/0226838 A1* | 10/2005 | Krause .................. A61K 8/736 424/70.13 |
| 2008/0146792 A1 | 6/2008 | Wang et al. |
| 2008/0160232 A1 | 7/2008 | Sasaguri et al. |
| 2013/0236624 A1 | 9/2013 | Trisak et al. |
| 2016/0257767 A1 | 9/2016 | Lubkoll et al. |

FOREIGN PATENT DOCUMENTS

| CN | 1583797 A | 2/2005 |
| CN | 101033261 A | 9/2007 |
| CN | 101139401 A | 3/2008 |
| EP | 2062923 A1 | 5/2009 |
| JP | 125454 B | 7/1937 |
| JP | S52-12936 A | 1/1977 |
| JP | S52-29884 A | 3/1977 |
| JP | 2016-523253 A | 11/2016 |
| WO | 11011217 A1 | 1/2011 |
| WO | 2015/055742 A1 | 4/2015 |
| WO | 2015055734 | 4/2015 |
| WO | 2015055741 | 4/2015 |

OTHER PUBLICATIONS

Han, J. A., & Lim, S. T. (2004). Structural changes in corn starches during alkaline dissolution by vortexing. Carbohydrate Polymers, 55(2), 193-199. (Year: 2004).*
International Search Report and Written Opinion for Application No. PCT/EP2014/072150 dated Jan. 13, 2015 (10 pages).
International Search Report and Written Opinion for Application No. PCT/EP2014/072162 dated Dec. 23, 2014 (11 pages).
United States Patent Office Action for U.S. Appl. No. 15/029,011 dated Apr. 27, 2018 (26 pages).
Almahdawi, F. H., Al-Yaseri, A. Z., & Jasim, N. (2014). Apparent viscosity direct from Marsh funnel test. Iraqi Journal of Chemical and Petroleum Engineering, 15(1), 51-57. (Year: 2014).
United States Patent Office Action for U.S. Appl. No. 15/029,011 dated Aug. 28, 2018 (15 pages).
Japanese Patent Office Action for Application No. 2016-523303 dated Sep. 11, 2018 (3 pages, English translation only).

(Continued)

*Primary Examiner* — Shaojia A Jiang
*Assistant Examiner* — Dale R Miller
(74) *Attorney, Agent, or Firm* — Michael Best & Friedrich LLP

(57) ABSTRACT

The invention concerns a process for the manufacture of an acylated polymer composition comprising amylose and/or amylopectin, comprising a pre-treatment step in the presence of an acid, a salt and a polycarboxylic acid, subsequent acylation and, preferably, a post-treatment step with an acid. The products obtained are useful as additives in inks, varnishes, lacquers, coatings, thickeners, adhesives or binders.

22 Claims, No Drawings

(56) References Cited

OTHER PUBLICATIONS

United States Patent Office Action for U.S. Appl. No. 15/029,011 dated Mar. 20, 2019 (19 pages).
Tupa et al., "Simple organocatalytic route for the synthesis of starch esters," Carbohydrate Polymers, 2013, 98:349-357.
Chemical Handbook, 5th Revised Basic Edition, 2004, p. II-340.

* cited by examiner

ACYLATION PROCESS

The present invention relates to an acylation process of polymer compositions comprising amylose and/or amylopectin, acylated polymer compositions comprising amylose and/or amylopectin products and the use of such acylated products in certain applications.

Acylated polymer compositions, like acetylated starch, are important processed renewable raw materials which can be used in a wide range of industrially applied polymers. They can be applied for example in inks (e.g. WO2012059), excipients in pharmaceutics (e.g. WO11011217) and foodstuffs (e.g. US2013236624).

A common process for the acylation of polymer compositions comprising amylose and/or amylopectin, such as starch, is the reaction of such a polymer composition with an acetylating agent, for example a carboxylic acid anhydride, which reacts with the hydroxyl functions of the polymer to form the acylated polymer composition. The physical properties of the acylated polymer composition, specifically acylated starch, are difficult to control in the acylation process. It is therefore an object of the present invention to provide an improved process for the acylation of polymer compositions comprising amylose and/or amylopectin, such as starch. An acylated polymer composition comprising amylose and/or amylopectin with superior physical properties is another object of the present invention. It is also the object of the present invention to provide a process for the manufacture of inks, varnishes, lacquers, coatings, thickeners, adhesives or binders using the acylated polymer composition comprising amylose and/or amylopectin with superior physical properties as ingredient.

It was now found that the physical properties of acylated polymer compositions, such as acylated starch, may effectively be controlled by treating the starch before acylation with an aqueous phase comprising one additive chosen from the group consisting of at least one acid A having a pKa of equal to or less than 4.8 at 25° C. and an enzyme, and additionally at least one salt and at least one polycarboxylic acid. The physical properties can further be controlled in an additional step after the acylation step, by treating the acylated polymer with at least one acid A' with a pKa of equal to or less than 4.8 at 25° C., in the presence of water.

Consequently, in its broadest embodiment, the invention concerns a process for the manufacture of an acylated polymer composition comprising amylose and/or amylopectin having a viscosity of equal to or greater than 77 mPas (10 w % in Triacetin at 30° C.) which comprises
(a) pre-treating a polymer composition comprising amylose and/or amylopectin with an aqueous phase comprising one additive chosen from the group consisting of at least one acid A having a pKa of equal to or less than 4.8 at 25° C. and an enzyme, and additionally at least one salt and at least one polycarboxylic acid.
(b) reacting the pre-treated polymer composition with an acylating agent to provide an acylated polymer composition comprising amylose and/or amylopectin.

The pre-treatment step in the process allows for efficient swelling of the polymer composition, therefore providing pre-treated polymer which can be efficiently acylated. Additionally, adjustment of the viscosity can be effected in the pre-treatment step. This is further detailed below. Preferred polymer compositions comprising amylose and/or amylopectin are starches.

In a preferred embodiment, the invention concerns a process for the manufacture of an acylated polymer composition comprising amylose and/or amylopectin having a viscosity of from equal to or greater than 77 mPas (10 w % in Triacetin at 30° C.) which comprises
(a) pre-treating a polymer composition comprising amylose and/or amylopectin with an aqueous phase comprising at least one additive chosen from the group consisting of at least one acid A having a pKa of equal to or less than 4.8 at 25° C. and an enzyme, and additionally at least one salt and at least one polycarboxylic acid.
(b) reacting the pre-treated polymer composition with an acylating agent to provide an acylated polymer composition comprising amylose and/or amylopectin, and
(c) reacting the acylated polymer composition obtained in step (b) with at least one acid A' with a pKa of equal to or less than 4.8 at 25° C., in the presence of water.

In step (c) according to the process in of the preferred embodiment, a partial hydrolysis takes place, by which the DS controlled. The resulting products have an improved EtOH tolerance. DS and EtOH tolerance are explained further below.

The invention further concerns an acylated polymer composition comprising amylose and/or amylopectin, which is obtainable by such a process.

Another object of the invention is an acylated polymer composition comprising amylose and/or amylopectin, having a degree of substitution (DS) in the range of from 2.1 to 2.9, wherein the viscosity of polymer composition is equal to or greater than 77 mPas (10 w % in Triacetin at 30° C.) and which has a EtOH tolerance of equal to or lower than 60% (v/v).

Preferred acylated polymer composition comprising amylose and/or amylopectin are starches.

A process for the manufacture of inks, varnishes, lacquers, coatings, thickeners, adhesives or binders, using acylated starch which has been provided by the claimed acylation process, and/or the acylated polymer composition comprising amylose and/or amylopectin obtainable by the claimed process and/or the acylated polymer composition comprising amylose and/or amylopectin having a degree of substitution (DS) in the range of from 2.1 to 2.9, wherein the viscosity of polymer is equal to or greater than 77 mPas (measured in a 10 w % in Triacetin solution at 30° C.) and which has an EtOH tolerance of equal to or lower than 60% (v/v), as an ingredient, is also claimed in the present invention. EtOH is intended to denote ethanol.

In the present specification, the plural form and the singular form are used interchangeably. Thus, it should be understood that the plural form also includes the singular form and vice-versa, unless otherwise indicated herein or clearly contradicted by context. For example, "acid" denotes a single acid or a mixture of two or more acids. As another example, "starch" denotes a single starch from a single source, amylopectin/amylose composition and/or modification as well as a mixture of two or more starches of different sources, amylopectin/amylose compositions, modifications etc.

Polymer compositions comprising amylose and/or amylopectin generally can consist of isolated fractions of amylose or isolated fractions of amylopectin, or a mixture of amylose and amylopectin. Starch is a preferred polymer composition which comprises essentially a mixture of amylose and amylopectin. Each of these materials are composed of D-glucose units linked to one another via α-(1-4) and α-(1-6) linkages, the latter being responsible for the branches in the structure of the molecule. The ratio between the amounts of amylose and amylopectin depends on the source of the polymer, e.g. starch. According to the present invention, the starch employed as starting material for the acylation process can comprise predominantly amylose or, conversely, predominantly amylopectin (waxy starch). Generally, whole starch and/or isolated fractions of amylose and/or isolated fractions of amylopectin can be used. According to the present invention, the term "polymer comprising amylose and/or amylopectin" includes its preferred form, namely "starch". The starches can be derived from any native source, wherein native relates to the fact that said starch is found in nature. Unless specifically distinguished, references to starch in this specification are meant to include their corresponding flours, which are still containing proteins, such as wheat gluten (hereinafter "starch"). In the present invention, a single several or starch sources can be used. The starch may also be combined out of several sources, isolated amylose fractions and/or amylopectin fractions, and/or derivatives like chemically or physically modified starch, which will be explained further below. Typical sources for the starches are cereals, tubers, roots, legumes, fruit starches and hybrid starches. Suitable sources include but are not limited to, millet, pea, potato, sweet potato, maize, sorghum, banana, barley, wheat, rice, sago, amaranth, tapioca, arrowroot and cannay. Preferred sources according to the present invention are selected from the group consisting of tubers, legumes or cereals. Even more preferably, the starch source is selected from the group consisting of pea, potato, sweet potato, wheat and maize. Most preferably, maize with a high amylopectin content (waxy maize) is used as starch source. Also suitable are starches derived from a plant obtained by breeding techniques including crossbreeding, translocation, inversion, transformation or any other method of gene or chromosome engineering to include variations thereof.

In another embodiment of the present invention, starch is used as starting material which is chemically and/or physically modified.

"Chemically modified starch" is intended to denote in particular the partial chemical modification of the hydroxyl-groups in amylose and/or amylopectin. Generally, chemically modified starches which can be selected as starting material according to the present invention can be classified as crosslinked starches, partially acetylated starches, partially etherified starches like hydroxyethylated, hydroxypropylated and methylated starches, inorganically esterified starches, cationic, anionic (like carboxymethyl starch), oxidized starches, zwitterionic starches, starches modified by enzymes. The preferred chemically modified starch is a partially hydroxypropylated starch.

In one embodiment of the present invention, the modified starch is maltodextrin.

"Physically modified starch" is intended to denote a starch that has been modified by a physical method. Generally, physical methods for the modification of starch include heat treatment, heat-moisture treatment, annealing, retrogradation, freezing, mechanical treatment, ultra high pressure treatment, gelatinization, glow discharge plasma treatment and osmotic pressure treatment.

According to the present invention, mixtures of any of the above mentioned starches, modified starches and/or flours, derived from any source, are also within the scope of this invention. For the sake of simplicity, the expression "starch" is intended to denote equally any of the starches, modified starches, flours and or/their mixtures, derived from any source with any amylopectin/amylose ratio.

In one embodiment of the invention, the employed starch has an amylose content of equal to or greater than 0% and equal to or lower than 60%, based on the sum of weights of amylose and amylopectin. Preferably, the employed starch has an amylose content of from 0% to 40%. Especially preferably, the employed starch has an amylose content of from 0% to 20%.

The term "acylation of a polymer composition comprising amylose and/or amylopectin" is intended to denote the reaction of free hydroxyl groups of the glucose units of a polymer composition comprising amylose and/or amylopectin with an acylating agent to form a corresponding acylated polymer composition comprising amylose and/or amylopectin. Principally, polymer composition comprising amylose and/or amylopectin correspond to formula $ST(OH)_3$ and reacts with a acylating agent to the correspondent acylated polymer composition comprising amylose and/or amylopectin of formula $ST(OH)_{3-x}(OC(O)R)_x$. "ST" denotes the amylose and/or amylopectin polymer backbone. In the formula $ST(OH)_{3-x}(OC(O)R)_x$, x denotes the DS (degree of substitution) of the hydroxyl groups in the starch. The DS is the average amount of acylated hydroxyl groups per glucose entity. Generally, the DS of the final acylated polymer composition comprising amylose and/or amylopectin according to the present invention is from 2.1 to 2.9. Preferably, the DS of the final acylated polymer composition comprising amylose and/or amylopectin is greater than 2.1. More preferably, the DS of the final acylated polymer composition comprising amylose and/or amylopectin is equal to or greater than 2.2. Most preferably, the DS of the final acylated polymer composition comprising amylose and/or amylopectin is equal to or greater than 2.3. Preferably, the DS of the final acylated polymer composition comprising amylose and/or amylopectin is equal to or less than 2.9. More preferably, the DS of the final acylated polymer composition comprising amylose and/or amylopectin is equal to or less than 2.85. If desired, the DS of the final acylated polymer composition comprising amylose and/or amylopectin is equal to or less than 2.7. In a most preferred embodiment of this invention, the DS of the final acylated polymer composition comprising amylose and/or amylopectin is from 2.3 to 2.85.

In the case that a partially chemically modified polymer composition comprising amylose and/or amylopectin is used, x relates to the free hydroxyl groups of the polymer composition comprising amylose and/or amylopectin. In this case, a modified polymer composition comprising amylose and/or amylopectin $ST(OR^m)_z(OH)_{(3-z)}$, wherein $R^m$ is intended to denote the chemically modifying group of the starting material such as methyl, reacts with an acylating agent to the correspondent acylated polymer composition comprising amylose and/or amylopectin of formula $ST(OR^m)_z(OH)_{(3-z)-x}(OC(O)R)_x$. In this equation, $R^m$ is a chemically modifying group which, in a first aspect does not bear a hydroxyl group. Thus, in the case that chemically modified polymer composition comprising amylose and/or amylopectin is used as starting material, the DS is meant to denote the sum of z and x, DS=x+z. For the sake of simplicity, DS is meant to denote x for chemically not modified starting material or chemically modified starting material when in a second aspect $R^m$ bears one hydroxyl group, for example hydroxypropyl, and DS=x+z in chemically modified starting material, when in a second aspect $R^m$ bears not hydroxyl group, throughout the specification.

According to the present invention, R is a linear or branched aliphatic or cycloaliphatic group containing 1 to 18 carbon atoms, an araliphatic group containing 7 to 12 carbon atoms or an aromatic group containing 6 to 12 carbon atoms. R can optionally be substituted by one or more halogens, preferably fluorine, $NO_2$, phenyl, $C(O)OR^1$, $OR^1$ or an aromatic group containing to 12 carbon atoms substituted by a $C_{1-6}$ aliphatic group. $R^1$ is a $C_1$-$C_4$ alkyl group, which can optionally be substituted by one or more halogens, preferably fluorine.

An acylating agent is intended to denote a reactant which is capable of reacting with the hydroxyl groups of the glucose units of a polymer composition comprising amylose and/or amylopectin, thereby transferring an acyl group —C(O)R, —C(O)R' and/or —C(O)R" to form the acylated polymer composition comprising amylose and/or amylopectin. Acylating agents may be, for example, carboxylic acid anhydrides $(RC(O))_2O$, but also unsymmetrical carboxylic acid anhydrides corresponding to the formula $(RC(O))(R"C(O))O$. Other suitable acylating agents comprise carboxylic acid halides or carbonylimidazoles.

According to one embodiment, the polymer composition comprising amylose and/or amylopectin is pre-treated in step (a) with an aqueous phase containing an acid A having a pKa of equal to or less than 4.8 at 25° C. and additionally at least one salt and at least one polycarboxylic acid. Generally, the acid A having a pKa of equal to or less than 4.8 at 25° C. is selected from the group consisting of mineral acids, sulfonic acids and carboxylic acids. The acid A can be either monoprotic or polyprotic. If acid A is polyprotic, at least $pKa_1$ is equal to or less than 4.8 at 25° C. Preferably, acid A is selected from the group consisting of sulfuric acid, amidosulfonic acid, methane sulfonic acid, benzene sulfonic acid or phosphoric acid. Most preferably, acid A is selected from the group consisting of sulfuric acid and benzene sulfonic acid. Generally, more than one acid A can be present in step (a). In this embodiment, acid A is added in step (a) in an amount of equal to or greater than 0.001 weight %, based on the amount of polymer composition comprising amylose and/or amylopectin. For this purpose, the weight of any moisture present in the polymer composition comprising amylose and/or amylopectin before step (a) is not taken into account when calculating the ratio of acid to polymer composition comprising amylose and/or amylopectin. If more than one acid A is added in step (a), the sum of weight percentages of the more than one acids A is the same as the weight percentage denoted in the specification for a single acid A. Preferably, acid A is added in step (a) in an amount of equal to or greater than 0.01 weight %. Most preferably, acid A is added in step (a) in an amount of equal to or greater than 0.1 weight %. Generally, acid A is added in step (a) in an amount of equal to or less than 5 weight %. Preferably, acid A is added in step (a) in an amount of equal to or less than 3 weight %. Most preferably, acid A is added in step (a) in an amount of equal to or less than 1.5 weight %. In a most preferred embodiment of this invention, the amount of acid A added in step (a) is from 0.3 to 1.3 weight %.

According to another embodiment, the polymer composition comprising amylose and/or amylopectin is pre-treated in step (a) with an aqueous phase containing an enzyme and additionally at least one salt and at least one polycarboxylic acid. Generally, the enzyme is selected from the group of hydrolases. Preferably, the enzyme is an amylase. The amylase can be of human, animal or plant origin, bacterial source, fungicidal source or genetically engineered microorganism source. Preferably, the amylase is selected from the group comprising glucoamylase, α-amylase, β-amylase and γ-amylase. A very preferred enzyme is the alpha-amylase Termamyl™. The enzyme used as additive in step (a) is added in an amount equal to or greater than 5 U (enzyme unit) per g polymer composition. Preferably, the enzyme used as additive in step (a) is added in an amount equal to or greater than 10 U (enzyme unit) per g polymer composition. Even more preferably, the enzyme used as additive in step (a) is added in an amount equal to or greater than 15 U (enzyme unit) per g polymer composition. Generally, the enzyme used as additive in step (a) is added in an amount equal to or lower than 200 U (enzyme unit) per g polymer composition. Preferably, the enzyme used as additive in step (a) is added in an amount equal to or lower than 150 U (enzyme unit) per g polymer composition. More preferably, the enzyme used as additive in step (a) is added in an amount equal to or lower than 100 U (enzyme unit) per g polymer composition. Most preferably, the enzyme used as additive in step (a) is added in an amount from 20 to 90 U/g polymer composition. Generally, enzyme degradation in step (a) is stopped by the addition of a 1 to 15% aqueous mineral acid, preferably aqueous hydrochloric acid.

According to the present invention, a polycarboxylic acid present in step (a). The term "polycarboxylic acid" is intended to denote a carboxylic acid bearing at least two carboxylic acid groups. The polycarboxylic acid comprises from 2 to 12 carbon atoms which can be substituted, additionally to the at least two carboxylic acid groups, with one or more substituents chosen from the group comprising primary, secondary or tertiary amines, amides, nitro, nitrile, amido, mercapto, optionally substituted or unsubstituted alkyl, optionally substituted or unsubstituted aryl, keto-group and aldehyde-group. In the case that the optionally substituted or unsubstituted polycarboxylic acid has one or more stereocenters, the term "polycarboxylic acid" as used in the present invention includes all racemates, enantiomers, diastereomers or mixtures of any of the foregoing. Generally, more than one polycarboxylic acid can be present in step (a).

Preferably, the polycarboxylic acid of step (a) is selected from the group consisting of oxalic acid, malonic acid and succinic acid, glutaric acid and adipic acid. Most preferably, the polycarboxylic acid is malonic acid.

According to the present invention, the polycarboxylic acid is added in step (a) in an amount of equal to or greater than 0.01 weight %, based on the amount of starch. For this purpose, the weight of any water present in the starch before step (a) is not taken into account when calculating the ratio of polycarboxylic acid to starch. If more than one polycarboxylic acid is added in step (a), the sum of weight percentages of the more than one polycarboxylic acids is the same as the weight percentage denoted above for a single polycarboxylic acid. Preferably, the polycarboxylic acid is added in step (a) in an amount of equal to or greater than 0.1 weight %. Most preferably, the polycarboxylic acid is added in step (a) in an amount of equal to or greater than 0.3 weight %. Generally, polycarboxylic acid is added in step (a) in an amount of equal to or less than 5 weight %. Preferably, the polycarboxylic acid is added in step (a) in an amount of equal to or less than 2.5 weight %. Most preferably, the polycarboxylic acid is added in step (a) in an amount of equal to or less than 1 weight %. In a most preferred embodiment of this invention, the amount of the polycarboxylic acid added in step (a) is from 0.35 to 0.9 weight %.

According to the present invention, a salt is present in step (a). The metal cation species of the salt is preferably chosen from groups 1, 2, 11 or 12 of the periodic system. Preferably, the salt cation is chosen from the group consisting of Mg2+, K+, Zn2+, Na+, Li+, Cu2+ and Ca2+, wherein Mg2+ is especially preferred. The anion species of the salt is selected from anions derived from mineral acids or organic acids, wherein the anion is preferably selected from the group consisting of sulfate, nitrate, chloride, carbonate, acetate and malonate. Especially preferred is carbonate. A very preferred salt in this embodiment is $MgSO_4$, another very preferred salt is MgCO$_3$. According to the present invention, the salt is added in step (a) in an amount of equal to or greater than 0.005 weight %, based on the amount of starch. For this purpose, the weight of any water present in the starch before step (a) is not taken into account when calculating the ratio of salt to starch. If more than one salt is added in step (a), the sum of weight percentages of the more than one salts is the same as the weight percentage denoted above for a single salt. Preferably, the salt is added in step (a) in an amount of equal to or greater than 0.05 weight %. Most preferably, the salt is added in step (a) in an amount of equal to or greater than 0.15 weight %. Generally, salt is added in step (a) in an amount of equal to or less than 2.5 weight %. Preferably, the salt is added in step (a) in an amount of equal to or less than 1.2 weight %. Most preferably, the salt is added in step (a) in an amount of equal to or less than 1 weight %. In a most preferred embodiment of this invention, the amount of the salt added in step (a) is from 0.2 to 0.8 weight %.

In step (a), the polymer composition comprising amylose and/or amylopectin is generally pre-treated at a temperature of equal to or greater than 20° C. More preferably, the pre-treatment temperature is equal to or greater than 40° C. Even more preferably, the pre-treatment temperature is equal to or greater than 50° C. The pre-treatment temperature is generally equal to or lower than 120° C. More preferably, the pre-treatment temperature is equal to or lower than 110° C. Even more preferably, the pre-treatment temperature is equal to or lower than 100° C. Most preferably, the pre-treatment temperature in a range of from 65° C. to 95° C.

In step (a), the polymer composition comprising amylose and/or amylopectin is generally pre-treated during a reaction time of equal to or greater than 1 minute. More preferably, the pre-treatment reaction time is equal to or greater than 3 minutes. Even more preferably, the pre-treatment reaction time is equal to or greater than 5 minutes. The pre-treatment reaction time is equal to or lower than 8 hours. More preferably, the pre-treatment reaction time is equal to or lower than 4 hours. Even more preferably, the pre-treatment reaction time is equal to or lower than 2 hours. Most preferably, the pre-treatment reaction time in a range of from 1 minute to 30 minutes.

Notably the viscosity of the acylated polymer composition comprising amylose and/or amylopectin is influenced by the choice of temperature and reaction time in step (a). For high viscosity of the acylated polymer composition comprising amylose and/or amylopectin, lower temperatures and/or shorter reaction times are suitably selected. For low viscosity, higher temperatures and/or longer reaction times are suitably selected.

In one embodiment of the invention, step (a) and subsequent reaction steps (b) (and (c), where applicable) are carried out in the presence of a carboxylic acid RC(O)OH. In this embodiment, the carboxylic acid RC(O)OH is added as reaction medium. Preferably, the acyl-group of the carboxylic acid RC(O)OH corresponds to the acyl-group transferred by the acylating agent. More preferably, the acylating agent is a symmetrical carboxylic acid anhydride of formula (RC(O))$_2$O and the carboxylic acid serving as reaction medium has the formula RC(O)OH, wherein R is defined as above, and RC(O) is the same in the carboxylic acid anhydride and carboxylic acid that serves as reaction medium. Most preferably, the acylating agent is acetic acid anhydride, and the carboxylic acid which serves as reaction medium is acetic acid. In this embodiment, generally the amount by weight of RC(O)OH added in step (a) is approximately equal to the amount by weight of starch, subtracting the potentially present moisture in the starch from the amount of starch in the calculation. Preferably, the amount of RC(O)OH is equal to or greater than 80 weight %. More preferably, the amount of RC(O)OH is equal to or greater than 90 weight %. Most preferably, the amount of RC(O)OH is equal to or greater than 95 weight %. Preferably, the amount of RC(O)OH is equal to or less than 120 weight %. More preferably, the amount of RC(O)OH is equal to or less than 110 weight %. Most preferably, the amount of RC(O)OH is equal to or less than 105 weight %. In a most preferred embodiment of this invention, the amount of RC(O)OH added in step (a) is from 95 to 105 weight %. Generally, more than one carboxylic acid RC(O)OH can be present in step (a).

According to the present invention, the amount of water in the aqueous phase present in step (a) is generally equal to or greater than 5 weight %, based on the amount of starch. For this purpose, the weight of any water present in the starch before step (a) is not taken into account when calculating the ratio of water to starch. Preferably, the amount of water is equal to or greater than 6 weight %. Most preferably, the amount of water is equal to or greater than 10 weight %. Generally, the amount of water in the aqueous phase present in step (a) is equal to or less than 30 weight %. Preferably, the amount of water is equal to or less than 25 weight %. Most preferably, the amount of water is equal to or less than 20 weight %. In a most preferred embodiment of the invention, the amount of water in the aqueous phase present in step (a) is from 10% to 20%.

According to the present invention, the pre-treated polymer composition comprising amylose and/or amylopectin of step (a) is reacted with an acylating agent in step (b). As outlined above, an acylating agent is intended to denote a reactant which is capable of reacting with the hydroxyl groups of the glucose units of the starch, thereby transferring an acyl group —C(O)R, —C(O)R' and/or —C(O)R" to form the acylated starch. Acylation agents may be, for example, carboxylic acid anhydrides (RC(O))$_2$O, but also unsymmetrical carboxylic acid anhydrides corresponding to the formula (RC(O))(R"C(O))O. Other suitable acylating agents comprise carboxylic acid halides or carbonylimidazoles. Generally, more than one acylating agent may be present in step (b).

This invention also relates to the formation of mixed acylated starch, where "mixed" is intended to denote more than one acylating agent present in the reaction, or a carboxylic acid R'C(O)OH is present in the acylation reaction with (R"C(O))$_2$O. In one embodiment, the acylation is carried out with the acylating agent (R"C(O))$_2$O in the presence of R'C(O)OH to give ST(OH)$_{3-x-y}$(OC(O)R')$_x$(OC(O)R")$_y$. Again, DS (x+y) in the final product is usually from 2.1 to 2.9. R' and R" denote independently from another the same as R above.

In one embodiment, the acylating agent is an unsymmetrical carboxylic acid anhydride (RC(O))(R"C(O))O, wherein R is not identical with R", and wherein mixed acylated starches are formed of the formula.

ST(OH)$_{3-x-y}$(OC(O)R')$_x$(OC(O)R")$_y$, with a DS=(y+x), which is usually from 2.1 to 2.9 are formed in the final product, and wherein R and R" are defined as above.

In a preferred embodiment, symmetrical carboxylic acid anhydrides are used as acylating agent. More preferably, R in (RC(O))$_2$O is —C$_2$H$_5$, —CH$_2$CH$_2$F, —CH$_2$CHF$_2$ or —CH$_2$CF$_3$, meaning that the carboxylic acid anhydrides are selected from the group comprising acetic acid anhydride, difluoro acetic acid anhydride and trifluoro acetic acid anhydride. Most preferably, the acylating agent is acetic acid anhydride.

In the specification, the term "acylating agent" is intended to include the term "one or more acylating agents".

According to the present invention, the acylating agent is generally added in step (b) at a reaction temperature of equal to or greater than 40° C. More preferably, the acylating agent is added in step (b) at a reaction temperature of equal to or greater than 50° C. Most preferably, the acylating agent is added in step (b) at a reaction temperature of equal to or greater than 60° C. Generally, the acylating agent is added in step (b) at a reaction temperature of equal to or lower than 100° C. More preferably, the acylating agent is added in step (b) at a reaction temperature of equal to lower than 90° C. Most preferably, the acylating agent is added in step (b) at a reaction temperature of equal to or lower than 80° C. In a most preferred embodiment, the acylating agent is added in step (b) at a reaction temperature from 62 to 78° C. In order to control the temperature during the exothermic acylation step, the acylating agent may be cooled before addition to the reaction mixture, for example to a temperature of from 3 to 10° C.

According to the present invention, the reaction mixture in step (b) after the addition of the acylating agent is generally heated for equal to or longer than 10 minutes. More preferably, the mixture in step (b) after the addition of the acylating agent is heated for equal to or longer than 20 minutes. Even more preferably, the mixture in step (b) after the addition of the acylating agent is heated for equal to or longer than 30 minutes. Generally, the reaction mixture in step (b) after the addition of the acylating agent is heated for equal to or less than 5 hours. More preferably, the mixture in step (b) after the addition of the acylating agent is heated for equal to or less than 4 hours. Even more preferably, the mixture in step (b) after the addition of the acylating agent is heated for equal to or less than 3 hours. The end point for the heating of the acylation reaction mixture in step (b) generally is indicated by complete or substantially complete dissolution of the slurry formed initially in step (a), indicating a complete or substantially complete acylation of the hydroxyl groups in the starch to a DS of equal to or more than 2.8, or, preferably, more than 2.9 in step (b). In a most preferred embodiment, the reaction time for the acylation reaction in step (b) is from 30 minutes to 3 hours.

According to the present invention, the reaction temperature at which the reaction mixture is kept in step (b) after addition of the acylating agent, is generally equal to or higher than 40° C. More preferably, the reaction temperature at which the reaction mixture is kept in step (b) after addition of the acylating agent, is equal to or higher than 50° C. Even more preferably, the reaction temperature at which the reaction mixture is kept in step (b) after addition of the acylating agent, is equal to or higher than 55° C. Generally, the reaction temperature at which the reaction mixture is kept in step (b) after addition of the acylating agent, is equal to or lower than 120° C. More preferably, the reaction temperature at which the reaction mixture is kept in step (b) after addition of the acylating agent, is equal to or lower than 110° C. Even more preferably, the reaction temperature at which the reaction mixture is kept in step (b) after addition of the acylating agent, is equal to or lower than 100° C. Most preferably, the reaction temperature at which the reaction mixture is kept in step (b) after addition of the acylating agent, is from 60° C. to 90° C.

In the specification, "amount of acylating agent" or "molar ratio of polymer composition comprising amylose and/or amylopectin to acylating agent" also denotes the sum of amounts of acylating agents used in step (b), when more than one acylating agent is used.

According to the present invention, complete or substantially complete acylation of the polymer composition comprising amylose and/or amylopectin can be achieved in step (b), with a DS of equal to or greater than 2.8, or, more preferably, 2.95. Accordingly, the molar ratio of acetylating agent and polymer composition comprising amylose and/or amylopectin is selected. For the calculation, the molar weight of the polymer composition comprising amylose and/or amylopectin is equalized with that of its repeating unit anhydroglucose. In the case of unmodified polymer composition comprising amylose and/or amylopectin, each mole of anhydroglucose bears basically three free hydroxyl groups which are acylated. Generally, the molar ratio of acylating agent to polymer composition comprising amylose and/or amylopectin in step (b) is equal to or higher than 3:1. Preferably, the molar ratio of acylating agent to polymer composition comprising amylose and/or amylopectin in step (b) equal to or higher than 4:1. Even more preferably, the molar ratio acylating agent to polymer composition comprising amylose and/or amylopectin in step (b) equal to or higher than 4.5:1. According to the present invention, the molar ratio of acylating agent to polymer composition comprising amylose and/or amylopectin in step (b) equal to or lower than 19:1. Preferably, the molar ratio of polymer composition comprising amylose and/or amylopectin to acylating agent in step (b) is equal to or lower than 1:8. Even more preferably, the molar ratio of acylating agent to polymer composition comprising amylose and/or amylopectin in step (b) equal to or lower than 7:1. Most preferably, the molar ratio of acylating agent to polymer composition comprising amylose and/or amylopectin is from 4:1 to 5.5:1.

Additional acylating agent may be present in step (b) corresponding to the amount of water present, and such excess of acylating agent is selected accordingly in addition to the molar ratio respective to the polymer composition comprising amylose and/or amylopectin.

According to the present invention, after completed acylation reaction in step (b), which is indicated by complete or substantially complete dissolution of the reactants, the reaction mixture of step (b) is suitably cooled to a temperature of from 40° C. to 70° C. More preferably, the reaction mixture is cooled to a temperature of from 45° C. to 65° C. To the reaction mixture, suitably a solution of carboxylic acid RC(O)OH, wherein the acyl residue of the carboxylic acid corresponds to at least one acyl residue of the at least one acylating agent of step (b), in water is added. By this, any excess of the acylating agent is converted into its corresponding carboxylic acid.

Generally, the DS of the acylated polymer composition comprising amylose and/or amylopectin as obtained by consecutive steps (a) and (b) is equal to or greater than 2.8, and often greater than 2.95. It has been found, surprisingly, that the treatment of the acylated polymer composition comprising amylose and/or amylopectin obtained by consecutive steps (a) and (b) with an acid A' in a step (c) in order to obtain an acylated polymer composition comprising amylose and/or amylopectin with a DS of from 2.1 to 2.9 has beneficial impact on the solubility of the acylated polymer composition comprising amylose and/or amylopectin. Such an acylated polymer composition comprising amylose and/or amylopectin displays a good solubility in a large variety of aprotic solvents such as esters, while simultaneously having a high EtOH tolerance. This is an unexpected characteristic of the acylated polymer composition comprising amylose and/or amylopectin obtainable by consecutive steps (a), (b) and (c), which cannot be achieved by e.g. partial acylation in step (b).

Consequently, according to a preferred embodiment of the present invention, the acylated polymer composition comprising amylose and/or amylopectin in the reaction mixture of consecutive steps (a) and (b) is thus reacted with at least one acid A' in step (c). In the specification, "acid A'" is intended to denote also "at least one acid A'", including more than one acids A'. Acid A' is defined to be an acid having a pKa of equal to or less than 4.8 at 25° C. Generally, the acid A' having a pKa of equal to or less than 4.8 at 25° C. is selected from the group consisting of mineral acids, sulfonic acids and carboxylic acids. Acid A' can be either monoprotic or polyprotic. If acid A' is polyprotic, at least $pKa_1$ is equal to or less than 4.8 at 25° C. Preferably, acid A' is selected from the group consisting of sulfuric acid, amidosulfonic acid, methane sulfonic acid, benzene sulfonic acid or phosphoric acid. Most preferably, acid A' is selected from the group consisting of sulfuric acid and benzene sulfonic acid. Generally, more than one acid A' can be added in step (c).

According to the present invention, the acid A' in step (c) is generally added to the reaction mixture at a temperature of equal to or higher than 40° C. Preferably, the acid A' in step (c) is added to the reaction mixture at a temperature of equal to or higher than 50° C. Even more preferably, the acid A' in step (c) is added to the reaction mixture at a temperature of equal to or higher than 60° C. Generally, the acid A' in step (c) is added to the reaction mixture at a temperature of equal to or lower than 100° C. Preferably, the acid A' in step (c) is added to the reaction mixture at a temperature of equal to or lower than 98° C. Even more preferably, the acid A' in step (c) is added to the reaction mixture at a temperature of equal to or lower than 95° C. In a most preferred embodiment, the acid A' in step (c) is added to the reaction mixture at a temperature of from 65° C. to 95° C.

According to the present invention, acid A' is added in step (c) in an amount of equal to or greater than 0.002 weight %, based on the amount of polymer composition comprising amylose and/or amylopectin provided to step (a). For this purpose, the weight of any moisture present in the polymer composition comprising amylose and/or amylopectin before step (a) is not taken into account when calculating the ratio of acid to polymer composition comprising amylose and/or amylopectin. If more than one acid A' is added in step (c), the sum of weight percentages of the more than one acids A' is the same as the weight percentage denoted in the specification for a single acid A'. Preferably, acid A' is added in step (c) in an amount of equal to or greater than 0.01 weight %. Most preferably, acid A' is added in step (c) in an amount of equal to or greater than 0.1 weight %. Generally, acid A' is added in step (c) in an amount of equal to or less than 5 weight %. Preferably, acid A' is added in step (c) in an amount of equal to or less than 2 weight %. Most preferably, acid A' is added in step (c) in an amount of equal to or less than 1 weight %. In a most preferred embodiment of this invention, the amount of acid A' added in step (c) is from 0.2 to 0.8 weight %.

After addition of acid A', the reaction mixture is usually kept at the addition temperature as defined above, for a time defined below as "post addition heating time".

The post-addition heating time in step (c) is chosen according to the intended DS of the final acylated polymer composition comprising amylose and/or amylopectin. Longer post-addition heating times will result in lower DS values. Generally, the post-addition heating time is equal to or longer than 10 minutes. Preferably, the post-addition heating time is equal to or longer than 20 minutes. Even more preferably, the post-addition heating time is equal to or longer than 30 minutes. According to the present invention, the post-addition heating time is equal to or less than 10 hours. Preferably, the post-addition heating time is equal to or less than 9 hours. Even more preferably, the post-addition heating time is equal to or less than 8 hours. In a most preferred embodiment, the post-addition heating time is from 50 minutes to 6 hours.

In step (c), the reaction time, temperature and amount of A' is chosen such that the DS of the final product is equal to or higher than 2.05. Preferably, the DS after step (c) is equal to or higher than 2.08. Even more preferably, the DS after step (c) is equal to or higher than 2.1. According to the present invention, the DS after step (c) is equal to or lower than 2.95. Preferably, the DS after step (c) is equal to or lower than 2.92. Even more preferably, the DS after step (c) is equal to or lower than 2.9. In a most preferred embodiment, the DS after step (c) is from 2.1 to 2.9.

It should be noted that the total amount of water present in the reaction mixture before the addition of acid A' in step (c) is preferably from 5 to 20%, and should suitably be adjusted accordingly if not already achieved.

According to the present invention, the acylated product is preferably recovered after step (c) by precipitation in water. Further isolation steps may comprise, e.g., washing, filtering, spinning, pressing, drying and/or milling.

In one embodiment of the present invention, any of the steps (a), (b) and (c) individually or in any combination may be performed in the presence of additional solvents, reactants or reagents, such as organic solvents like dichloromethane or toluene.

According to another embodiment, at any time during the process according to the present invention, solvents, reactants or reagents are recovered from the process for further use.

The pKa value, known as acid dissociation constant, of acid A may be determined by standard potentiometric titration procedure. Alternatively, NMR or UV determination methods can be employed for pKa determination.

The DS value is measured by the following method: The acylated polymer is reacted with sulfuric acid for a time of from 15 to 30 hours at a temperature of from 18 to 23° C. The reaction mixture is subjected to a steam distillation, preferably in an automated distillation apparatus such as Vapodest 40s (Gerhardt Analytical Systems). The distillate is titrated with NaOH. The DS can be calculated from the amount of NaOH which is needed to neutralize the distillate.

The EtOH tolerance is a solubility parameter. It describes the amount of ethanol which is necessary to precipitate a defined amount of a product, in this case the acylated starch, from a solution of a defined concentration in which the acylated starch is completely dissolved, preferably a solution in an aprotic solvent such as ethyl acetate. The higher the EtOH tolerance, the higher the tolerance of the product towards a protic solvent in the presence of an aprotic solvent. Generally, acylated starches are either soluble in protic or aprotic solvents. It has been found, surprisingly, that the acylated starches obtained by the process according to the present invention display a good solubility towards aprotic solvents while simultaneously tolerating protic solvents. This makes the acylated starches according to the present invention very suitable for use in inks, varnishes, lacquers, coatings, thickeners, adhesives or binders, which all use a large variety of different solvent systems.

EtOH Tolerance is measured in a turbidity titration using a T70 Titration Excellence Line of Mettler Toledo with a DP5-Phototrode.

For the titration a 10% solution of acylated polymer composition comprising amylose and/or amylopectin in EtOAc is prepared, and a sample of 25 mL of this 10% solution in EtOAc is automatically titrated with EtOH at 25° C. EtOAc is intended to denote ethyl acetate.

For acylated polymer compositions comprising amylose and/or amylopectin with a DS from 2.1 to 2.45, the end point of the titration is a solid content of precipitated acylated polymer composition comprising amylose and/or amylopectin between 3.7% to 4.7%. The EtOH tolerance in this DS range for the acylated polymer comprising amylose and/or amylopectin according to the present invention is from 53% (v/v) to 63 (v/v). This denotes that 3.7% to 4.7% of the acylated polymer precipitates in a solution of from 53% (v/v) of EtOH in EtOAc to 63% (v/v) of EtOH in EtOAc. This also relates to the EtOH-dilutibility of the acylated polymer, which is further described below. The EtOH dilutibility in the DS range from 2.1 to 2.45 for the acylated polymer comprising amylose and/or amylopectin according to the present invention is from 1.12 to 1.7.

For acylated polymer compositions comprising amylose and/or amylopectin with a DS from 2.46 to 2.9, the end point of the titration is a solid content of precipitated acylated starch between 4.4% to 9.5%. The EtOH tolerance in this DS range is equal to or lower than 60% (v/v). Preferably, the EtOH tolerance in this DS range is from 5% (v/v) to 56% (v/v). This also relates to the EtOH-dilutibility of the acylated polymer, which is further described below. The EtOH dilutibility in the DS range from 2.46 to 2.9 for the acylated polymer comprising amylose and/or amylopectin according to the present invention is equal to or lower than 1.5. Preferably, the EtOH dilutibility in this DS range is from 0.05 to 1.27.

The EtOH tolerance is an alternative way to describe the "non-solvent-dilutibility", here EtOH dilutibility, of the acylated compositions comprising amylose and/or amylopectin in a solvent in which the polymer can be well solved, which is in this case EtOAc. A solution consisting of acylated polymer and EtOAc is titrated against a polar solvent, often water, but in the present invention EtOH, which will not solve the polymer and is the non-solvent. The polymer composition comprising amylose and/or amylopectin in EtOAc is titrated against EtOH until turbidity is observed as described above, indicating flocculation of polymer precipitating out of the titrated polymer composition in EtOAc. The non-solvent-dilutibility is a term known is the literature, e.g. in J. Prieto and J. Kiene, "Holzbeschichtung", p. 61, 2007, published by Vincentz Network GmbH (ISBN 3-87870-749-5) where it is identified by the german term "Verschneidbarkeit", which is defined as the amount of non-solvent, in the present invention EtOH, which can be added to a solution of polymer in an amount of solvent, which is EtOAc in the present invention, until gelatinization or flocculation is observed. For example, a dilutibility of 1,12 indicates that up to 1.12 parts of EtOH can be added to the solution containing acylated polymer comprising amylose and/or amylopectin and 1 part EtOAc until precipitation is observed. The dilutibility as used in the present invention not only indicates the suitability of the solvent for a given polymer, but, for a given non-solvent/solvent system at a given concentration and temperature, also the tolerance of a polymer against the non-solvent in its solvent. This characteristic not only related to the DS of a polymer composition comprising amylose and/or amylopectin, but presumably is also directly dependent on the substitution pattern of the hydroxyl-group of the polymer composition, which is effectively controlled in the process according to the present invention. The viscosity of a fluid is a measure of its resistance to gradual deformation by shear stress or tensile stress. For liquids, it corresponds to the informal notion of "thickness". Solutions of an acylated polymer composition comprising amylose and/or amylopectin can also be characterized by their viscosity, which is mainly dependent on the physical and chemical properties of the acylated polymer composition comprising amylose and/or amylopectin, when viscosities of the same concentration, in the same solvent and at the same temperature are compared. It has been found, surprisingly, that the viscosity of the acylated polymer composition comprising amylose and/or amylopectin according to the present invention can be influenced in a desirable range by setting reaction parameters accordingly, notably the parameters of step (a). This makes the acylated polymer composition comprising amylose and/or amylopectin according to the present invention very suitable for use in inks, varnishes, lacquers, coatings, thickeners, adhesives or binders, which all use a large variety of different solvent systems and have various specific viscosity requirements in those solvent systems.

The acylated polymer compositions comprising amylose and/or amylopectin obtainable by the process according to the present invention possess a viscosity, measured in a 10% (w/w) solution in Triacetin at 30° C. with a rotational viscosimeter, such as Rheomat R180 (ProRheo), of equal to or greater than 77 mPas. Preferably, the viscosity is equal to or larger than 100 mPas. Even more preferably, viscosity is equal to or larger than 200 mPas. Generally, the viscosity is equal to or lower than 2200 mPas (measured in a 20% (w/w) solution in 16 w % EtOH in EtOAc at 30° C.); preferably, the viscosity is equal to or lower than 2100 mPas. Most preferred is a viscosity of equal to or lower than 2000 mPas.

According to one preferred aspect, the process according to the present invention is carried out in a continuous mode. In another aspect, it can be advantageous to operate one or more steps of the present invention in a batch-wise mode.

Should the disclosure of any patents, patent applications, and publications which are incorporated herein by reference conflict with the description of the present application to the extent that it may render a term unclear, the present description shall take precedence.

EXAMPLES

Example 1

20 kg of waxy maize with a moisture content of 12.1 weight was reacted with 17 l of glacial acetic acid, 40 g of sulphuric acid and a mixture of 40 g of a malonic acid (50 weight % solution in water) and 15 g of MgCO3 (30 weight % suspension in water during 1.5 h at a temperature of 75° C.

58 l of acetic anhydride (91.2% w/w, T=8° C.) were added in portions (approx. 2-5 l) during 1.2 h. The reaction temperature was kept between 75 and 90° C. After 3 h the starch acetate was completely dissolved. The reaction mixture was cooled down to 50° C. 7 l of 56.5% w/w acetic acid in water were added. Afterwards 5-25 l portions of the reaction mixture were poured in approx. 100 l of cooled water to precipitate the product.

The precipitated powder was washed until no acetic acid was detectable.

The starch acetate powder was pressed of to a solid content of approx. 20 weight % and dried to a moisture content of approx. 0.5-3 weight %.

The characteristics of the starch acetate obtained were as following:
DS=2.98
Viscosity (10 weight % in triacetine, 30° C.) 100 mPas
Soluble in ethylacetate, triacetine, chloroform Example 2

In example 1, after the acetylation reaction is stopped by addition of 56.5% w/w acetic acetic acid in water, a water content of 10-12 weight % was adjusted in the reaction mixture, the reaction mixture was heated up until a temp. between approx. 70-95° C. and 0.002 weight % of concentrated sulphuric acid (95-98% w/w) was added. In 1-10 h a series of different DS (substitution degree 2.9-1.6) was obtained.

Example 3

10 kg of waxy maize with a moisture content of 12.4 weight was reacted with 12 l of glacial acetic acid and 70 g of benzene sulfonic acid (75 weight % in water) during 1.5 h at a temperature of 75° C.

67 l of acetic anhydride (91.2% w/w, T=8° C.) were added in portions (approx. 2-5 l) during 1.2 h. The reaction temperature was kept between 75 and 90° C. After 3 h the starch acetate was completely dissolved. The reaction mixture was cooled down to 50° C. 10 l of 56.5% w/w acetic acid in water were added.

Afterwards, a water content of 8-12 weight % was adjusted in the reaction mixture, the reaction mixture was heated up until a temp. between approx. 70-95° C. and 0.2 weight % of concentrated sulphuric acid (95-98% w/w) was added. Afterwards 5-25 l portions of the reaction mixture were poured in approx. 100 l of cooled water to precipitate the product.

The precipitated powder was washed until no acetic acid was detectable.

The starch acetate powder was pressed of to a solid content of approx. 20 weight % and dried to a moisture content of approx. 0.5-3 weight %.

In 1-10 h a series of different DS (substitution degree 2.9-1.6) was obtained.
Viscosity (35 weight % in ethylacetate, 25° C.) 379 mPas, DS=2.7;
Soluble in ethylacetate, triacetine, chloroform.

The invention claimed is:

1. An acylated polymer composition comprising acylated amylose and/or acylated amylopectin, which is made by a process comprising the following steps:
(a) pre-treating a polymer composition comprising amylose and/or amylopectin with an aqueous phase, the aqueous phase comprising at least one salt, at least one polycarboxylic acid, and one additive selected from the group consisting of at least one acid A having a pKa of equal to or less than 4.8 at 25° C. and an enzyme;
(b) reacting the pre-treated polymer composition with an acylating agent to provide an acylated polymer composition comprising acylated amylose and/or acylated amylopectin; and
(c) reacting the acylated polymer composition obtained in step (b) with at least one acid A' with a pKa of equal to or less than 4.8 at 25° C., in the presence of water.

2. The acylated polymer composition of claim 1, the acylated polymer composition having a degree of substitution (DS) in the range of from 2.1 to 2.9, and wherein the acylating agent is acetic acid anhydride.

3. An acylated polymer composition comprising acylated amylose and/or acylated amylopectin, which is made by a process comprising the following steps:
(a) pre-treating a polymer composition comprising amylose and/or amylopectin with an aqueous phase comprising at least one salt, at least one polycarboxylic acid, and one additive selected from the group consisting of at least one acid A having a pKa of equal to or less than 4.8 at 25° C. and an enzyme;
(b) reacting the pre-treated polymer composition with an acylating agent to provide an acylated polymer composition comprising acylated amylose and/or acylated amylopectin; and
(c) reacting the acylated polymer composition obtained in step (b) with at least one acid A' with a pKa of equal to or less than 4.8 at 25° C., in the presence of water,
wherein the viscosity of polymer composition is equal to or greater than 77 mPas (10 w % in Triacetin at 30° C.).

4. A process for manufacturing an acylated polymer composition comprising acylated amylose and/or acylated amylopectin, having a viscosity of equal to or greater than 77 mPas (10 w % in Triacetin at 30° C.), which comprises:
(a) pre-treating a polymer composition comprising amylose and/or amylopectin with an aqueous phase, the aqueous phase comprising at least one salt, at least one polycarboxylic acid, and one additive selected from the group consisting of at least one acid A having a pKa of equal to or less than 4.8 at 25° C. and an enzyme; and
(b) reacting the pre-treated polymer composition with an acylating agent to provide an acylated polymer composition comprising acylated amylose and/or acylated amylopectin.

5. The process according to claim 4 further comprising:
(c) reacting the acylated polymer composition obtained in step (b) with at least one acid A' with a pKa of equal to or less than 4.8 at 25° C., in the presence of water.

6. The process according claim 5, wherein the at least one acid A used in step (a) and the at least one acid A' used in step (c) can be the same or different and are selected from the group consisting of mineral acids, sulfonic acids, and carboxylic acids, all of which are either monoprotic or polyprotic.

7. The process according to claim 6, wherein the at least one acid A and the at least one acid A' are the same or different, and are sulfuric acid, amidosulfonic acid, benzene sulfonic acid, or phosphoric acid.

8. The process according to claim 5, wherein the additive is an enzyme, and wherein acid A' in step (c) is selected from the group consisting of mineral acids, sulfonic acids and carboxylic acids, all of which are either monoprotic or polyprotic.

9. The process according to claim 8, wherein the enzyme is an amylase.

10. The process according to claim 5, wherein the reaction time and reaction temperature of step (c) is selected such that the degree of substitution (DS) of the acylated polymer composition comprising amylose and/or amylopectin is from between 2.0 to 2.9.

11. The process of claim 4, wherein in step (a) the polymer composition comprising amylose and/or amylopectin is pre-treated at a temperature in a range of from 20° C. to 85° C. during a pre-treatment time in a range of from 1 minutes to 30 minutes.

12. The process according to claim 4, wherein the at least one polycarboxylic acid has from 2 to 12 carbon atoms, and at least two carboxylic acid groups —COOH.

13. The process according to claim 12, wherein the polycarboxylic acid is at least one dicarboxylic acid and is selected from the group consisting of oxalic acid, malonic acid and succinic acid, glutaric acid, and adipic acid.

14. The process according to claim 4, wherein the salt consists of a metal cation species and an inorganic or organic anion species.

15. The process according to claim 14, wherein the metal cation species is selected from the group consisting of $Mg^{2+}$, $K^+$, $Na^{2+}$, $Li^+$, $Cu^{2+}$, and $Ca^{2+}$, and the anion is selected from the group consisting of sulfate, nitrate, chloride, carbonate, acetate, and malonate.

16. The process according to claim 4, wherein the acylating agent is selected from the group consisting of carboxylic acids, symmetrical or unsymmetrical carboxylic acid anhydrides, carboxylic acid halides, and carboxylic acid carbonylimidazoles.

17. The process according to claim 16, the acylated polymer composition having a degree of substitution (DS) in the range of from 2.1 to 2.9, and wherein the carboxylic acid anhydride is acetic acid anhydride.

18. The process according to claim 4, wherein step (a) is carried out in the presence of a monocarboxylic acid, wherein the monocarboxylic acid corresponds to the carboxylic acid obtained by hydrolysis of the acylating agent.

19. The process according to claim 4, wherein the polymer composition comprising amylose and/or amylopectin provided in step (a) is selected from the group consisting of chemically modified starches, unmodified starches, and a mixture of chemically modified starches and unmodified starches, and wherein the chemically unmodified starch is selected from the group consisting of maize starch, wheat starch, potato starch, rice starch, pea starch, rye starch, millet starch, and manioc starch, and wherein the chemically modified starch is selected from the group consisting of chemically modified maize starch, chemically modified wheat starch, chemically modified potato starch, chemically modified rice starch, chemically modified pea, chemically modified rye starch, chemically modified millet starch, and chemically modified manioc starch.

20. The process according to claim 19, wherein the chemically modified starch is selected from the group consisting of crosslinked starches, acylated starches, hydroxyethylated starches, hydroxypropylated starches, methylated starches, oxidized starches, and cationic or anionic starches.

21. The process according to claim 4, wherein the time and temperature of the pre-treatment are selected such that the viscosity of the final acylated polymer composition comprising amylose and/or amylopectin is equal to or greater than 77 mPas (10 w % in Triacetin at 30° C.).

22. A process of manufacturing inks, varnishes, lacquers, coatings, thickeners, adhesives, or binders comprising the acylated polymer composition according to claim 1 as an ingredient in the process.

* * * * *

UNITED STATES PATENT AND TRADEMARK OFFICE
CERTIFICATE OF CORRECTION

PATENT NO. : 10,538,597 B2
APPLICATION NO. : 15/029006
DATED : January 21, 2020
INVENTOR(S) : Jana Lubkoll et al.

It is certified that error appears in the above-identified patent and that said Letters Patent is hereby corrected as shown below:

Column 17, Claim 15, Lines 12-13:
Replace "$Na^{2+}$" with "$Zn^{2+}$"

Signed and Sealed this
Fourteenth Day of April, 2020

Andrei Iancu
*Director of the United States Patent and Trademark Office*